(12) United States Patent
Pintsov et al.

(10) Patent No.: US 7,797,250 B2
(45) Date of Patent: Sep. 14, 2010

(54) METHOD FOR ELECTRONICALLY ENDORSING CHECK IMAGES

(75) Inventors: Leon A. Pintsov, West Hartford, CT (US); David Pintsov, San Diego, CA (US)

(73) Assignee: Pitney Bowes Inc., Stamford, CT (US)

( * ) Notice: Subject to any disclaimer, the term of this patent is extended or adjusted under 35 U.S.C. 154(b) by 1103 days.

(21) Appl. No.: 11/282,998

(22) Filed: Nov. 18, 2005

(65) Prior Publication Data

US 2007/0118747 A1 May 24, 2007

(51) Int. Cl.
*G06Q 20/00* (2006.01)

(52) U.S. Cl. .............................. 705/70; 705/64; 713/176

(58) Field of Classification Search ................. 713/176; 705/64, 70
See application file for complete search history.

(56) References Cited

U.S. PATENT DOCUMENTS 5,677,955 A 10/1997 Doggett et al. ................ 380/24
2002/0152170 A1* 10/2002 Dutta et al. .................... 705/45
2003/0112236 A1* 6/2003 Cordner ...................... 345/419
2006/0112013 A1* 5/2006 Maloney ...................... 705/45

FOREIGN PATENT DOCUMENTS

| EP | 1429298 A2 | 6/2004 |
| GB | 2 317 790 A | 4/1998 |
| WO | 03/077473 A1 | 9/2003 |

* cited by examiner

*Primary Examiner*—Christopher J Brown
(74) *Attorney, Agent, or Firm*—Ronald Reichman; Angelo N. Chaclas; Brian A. Collins

(57) ABSTRACT

A method of electronically endorsing a check includes obtaining an electronic image of the check and composing an endorsement data element for the check that includes at least first information identifying a party endorsing the check. The method further includes creating a message data file including the electronic image and the endorsement data element, and creating a signed message data file that includes the message data file and a digital signature of the message data file creating using a private key. The private key may be specific to the party endorsing the check or to an electronic device with which the method is implemented. Also, a method of performing an inquiry relating to a check that was endorsed as described above using the endorsement data element.

21 Claims, 2 Drawing Sheets

METHOD FOR ELECTRONICALLY ENDORSING CHECK IMAGES

FIELD OF THE INVENTION

The present invention relates to check image processing, and in particular to a method for electronically endorsing check images.

BACKGROUND OF THE INVENTION

Traditionally, businesses have deposited checks received from, for example, customers by physically taking them to a branch of their bank and depositing them over the counter with a teller or dropping them into a night deposit box. The actual physical presentation of checks to be deposited was necessary because, under prior banking laws, the depository bank had to present the original of each check to the corresponding paying bank in order to clear the check. This changed in October of 2004 with the enactment of The Check Clearing for the $21^{st}$ Century Act, commonly referred to Check 21. Check 21 removed the legal requirement that an original paper check had to be presented to obtain payment. Instead, banks can now use digital images to transport check data from the bank of first deposit to the paying bank. If the paying bank cannot process a check image, the image can be printed, according to certain specifications, to create what is known as a substitute check (or IRD image replacement document), which is the legal equivalent of the original paper check. Check 21 has thus opened the door for remote check deposit solutions wherein check images, sometimes referred to as truncated checks, rather than original paper checks, are used to make deposits, thereby enabling businesses to eliminate trips to the bank. In addition, the use of check images also reduces check transportation costs among banks and improves funds availability.

As is known, a number of operations are performed on a check as it moves through the check processing/clearing system from the time it is first presented for deposit to the time it reaches the bank on which it is drawn. For example, in order for the check to be cleared and paid, it is endorsed one or more times between the time that it is deposited and the time it reaches the bank on which it is drawn. It is desirable for the various parties involved in the processing/clearing of checks to be able to audit the movement of the checks through the processing/clearing system. Traditional, paper checks, as a result of their passing through various financial institutions, are provided with information during the clearing process that is particularly suited for and that enables the auditing of the entire check clearing process. Specifically, paper checks are, as a general rule, physically endorsed during the clearing process. This is typically done by hand signing and/or stamping/imprinting the reverse side of the check with certain information that may later be utilized for an audit or other investigative purposes. The information provided by physical endorsement is physically bonded to the substrate (paper check), thereby providing a linkage between the physical check and the information that may be used as evidence for audit, investigative or dispute resolution purposes. As check 21 is expected to greatly increase the use of electronic check images in the check processing/clearing system, it would be advantageous to be able to replicate this functionality (i.e., the audit, investigative and dispute resolution functionality delivered through physical endorsement) in the environment where check images, rather than paper checks, are used for check processing/clearing.

SUMMARY OF THE INVENTION

The present invention relates to a method of electronically endorsing a check, and in particular an electronic image of the check, which provides much of the audit, investigative and dispute resolution functionality that is currently available with paper checks that are physically endorsed. The method includes obtaining an electronic image of the check (either by generating the image from a paper check or receiving the image from a third party) and composing an endorsement data element for the check that includes at least a first information element identifying a party endorsing the check. The method further includes creating a message data file including the electronic image and the endorsement data element, and creating a signed message data file that includes the message data file and a digital signature of the message data file created by using a private key. The private key may be specific to the party endorsing the check or to an electronic device with which the method is implemented, or both. It should be expressly noted here that there are many cryptographic primitives that allow one to achieve authentication of an entity that sends the data and authentication of the data origin and its integrity. These primitives include, but are not limited to, digital signatures and Message Authentication Codes and similar primitives. The method and the system of the present invention work equally well with all primitives that allow one to achieve the aforementioned security services, namely entity and data origin authentication and data integrity.

The endorsement data element may also include a second information element identifying a date and/or time on which the check was endorsed. The first information element may also include a routing number for the party endorsing the check, a branch identifier for the party endorsing said check (e.g. a branch of a bank) and/or an item sequence number created and maintained by the party endorsing said check, as well as the date of endorsement.

In one particular embodiment, the method further includes obtaining one or more check data elements from the electronic image, (this can be done for example by using OCR), wherein the message data file also includes the one or more check data elements. The check data elements may include one or more of the issuing bank routing number of the check, the account number of the check, the check number of the check, the amount of the check, the mailing or electronic address of the party issuing the check (payer), the party to whom the check is issued (payee), and the date of issue. The method may also further include transmitting the signed message data file to an upstream processor and/or archiving the signed message data file. In another particular embodiment, the method further includes, prior to the step of creating the message data file, electronically superimposing the endorsement data element on the electronic image of the check (normally but not necessarily of the reverse side of the check) in a manner such that the endorsement data element can be seen by a human observer when viewing the electronic image.

The present invention also relates to method of performing an inquiry relating to a check that was endorsed as described above. The method includes obtaining the signed message data file for the check, obtaining and verifying a public key corresponding to the private key that was used for the message signing, determining whether the signed message data file can be authenticated using the digital signature contained therein and the public key, and, if the signed message data file can be authenticated, retrieving the endorsement data element from the message data file for use in the inquiry. Alternatively, the content of the endorsement data can be obtained by using OCR on the superimposed image of endorsement data.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
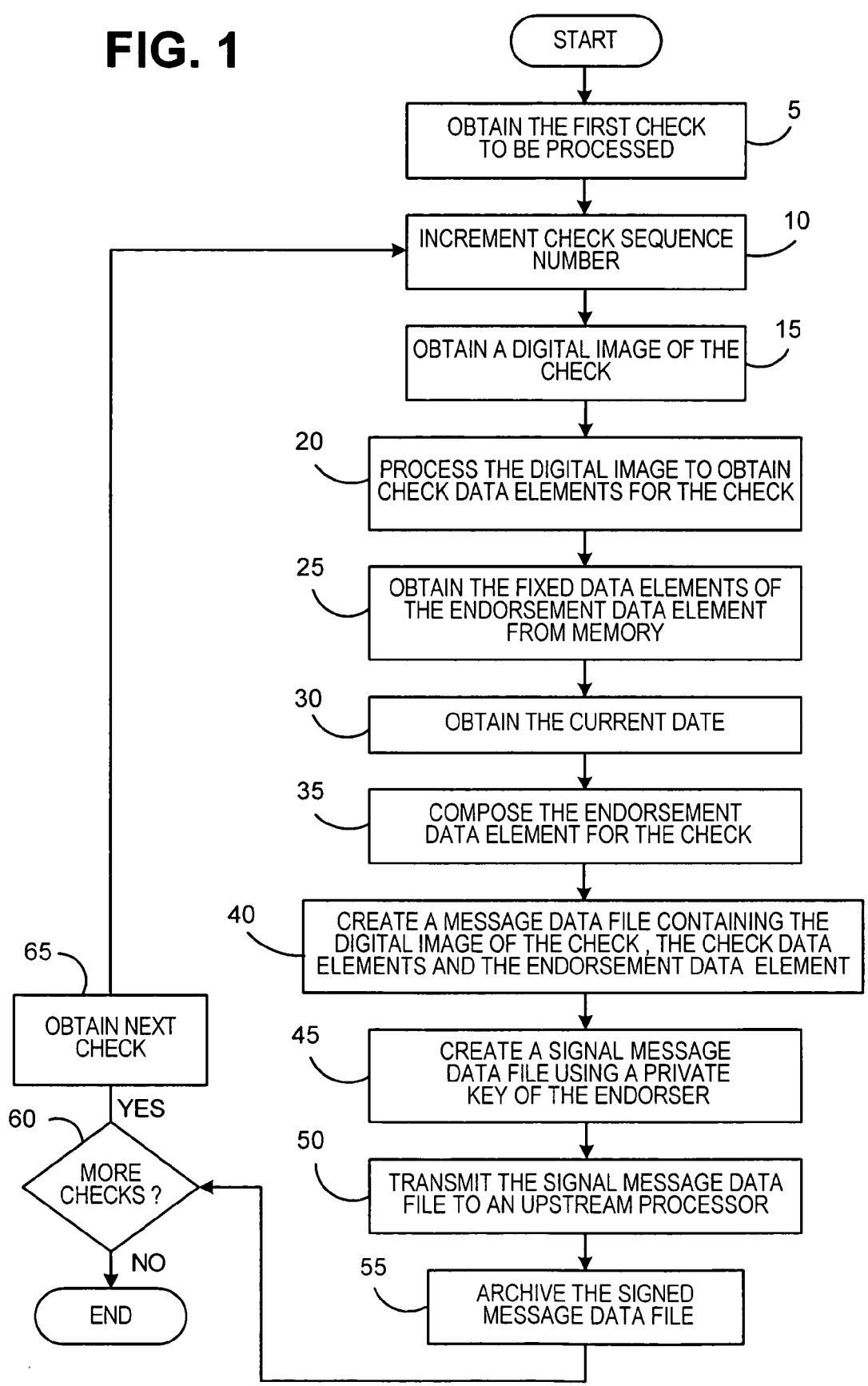
FIG. 1 is a flowchart showing a method for electronically endorsing check images according to an embodiment of the present invention.

FIG. 1 is a flowchart showing a method for electronically endorsing check images according to an embodiment of the present invention that will provide much of the audit, investigative and dispute resolution functionality that is currently available with paper checks that are physically endorsed. It is contemplated that the method will be performed by a bank or similar institution that has received a check for processing (either as a physical paper check or an electronic image of a check), such as, without limitation, a bank of first deposit for the check. It is also contemplated that the bank or similar institution will employ a check processing device that includes a processing unit, a memory and, preferably, a scanner, wherein the device is specifically designed or adapted, typically through software additions or modifications, to provide the functionality of the method described herein. A number of suitable scanners are known and commercially available and may include, for example, the Unisys Source NDP or SEAC scanners.

The method described herein identifies a set of one or more data elements (referred to collectively as an endorsement data element or EDE) that are typically required in the endorsement of physical checks and establishes an information processing method that allows these data elements to be added to electronic check images in a manner that binds these elements with the check images in such a way as to prevent any unauthorized alteration of the resulting electronic data file.

The data elements that may be included in the endorsement data element may include one or more of, and preferably all of, the following: (1) the endorsing bank branch identifier, which is an identifier of the branch of the bank or other institution that is utilizing the process described herein to endorse the check, (2) the endorsing bank routing number, which is the routing number of the bank that is utilizing the process described herein to endorse the check, (3) the endorsement date, which is the date on which the check is being endorsed, (4) the endorsing bank item sequence number, which is, for example, a serial number created and maintained by the endorsing bank that is incremented each time it endorses a check in the manner described herein, (5) a truncation indicator (an element that indicates that check has been truncated by the endorsing institution; if this indicator is set to be true it indicates that Bank Of First Deposit is truncator of the original check), (6) an endorsing bank correction indicator (to identify whether and how the MICR line on the check was repaired, for fields other than Payer Bank Routing and Transit Number and amount), and (7) a return reason (reason for non-payment).

As is known, these data elements represent information that is commonly required for the physical endorsement of a paper check. Other data elements may also be used within the scope of the present invention. The main purpose of the endorsement data element is to provide an audit trail and evidence for investigative or dispute resolution purposes, such as for the prosecution of fraud or not sufficient funds to cover to payment for the check. All of the data elements identified above are predetermined and fixed (unchanging) for any particular bank employing the method described herein with the exception of the endorsing bank item sequence number and the endorsing bank endorsement date, which may change with each check that is endorsed. Thus, the fixed data elements may be stored in the memory of the device implementing the method of the present invention and accessed as needed. As described below, the non-fixed data elements may be readily determined at the time of processing.

FIG. 1 shows a particular embodiment of the present invention in which physical, paper checks are individually processed. As described below, the method of the present invention may also be used, with a few minor modifications, to process checks that, when received by the processing party, are already in electronic form (as in the case where a number of check images are submitted for electronic deposit). Referring to FIG. 1, the method begins at step 5, wherein the first check to be processed is obtained. Next, at step 10, the endorsing bank item sequence number is incremented by one (the increment step can also be greater than one to accommodate insertion of items if desired). As will be appreciated, the endorsing bank item sequence number will initially be set to zero at the time the bank or other institution first implements the method of processing described herein. Next, at step 15, a digital image of the check is obtained. Typically, this step will involve loading the physical, paper check into a feeder of the check processing device and causing the check to be fed and scanned by the included scanner to obtain a digital or electronic image of the check.

At step 20, the digital image of the check is processed, such as by using known optical character recognition (OCR) techniques, to obtain certain information from the check referred to herein as check data elements. The check data elements may include one or more of the issuing bank routing number, the account and check number of the check, the check amount, the mailing and/or electronic address of the issuing party, the payee, the date and/or any other data element that is identifiably present on the check. In an alternative embodiment, step 20 may be omitted, with the method proceeding directly from step 15 to step 25. At step 25, the fixed data elements of the endorsement data element are obtained from the memory of the device on which the invention is implemented. At step 30, the current date, which will serve as the endorsement date, is obtained, such as from an internal clock provided with the device on which the invention is implemented. The current date information may also include the current time with the commonly accepted and agreed upon level of accuracy (e.g. minutes, seconds, tenths of seconds etc.). Then, at step 35, the particular endorsement data element for the check then being processed is composed by combining the fixed data elements (step 25) with the endorsing bank item sequence or trace number (step 10) and the endorsement date (step 30). As described above, the fixed data elements may include one or more of, and preferably all of, the data elements (1)-(7) identified above.

Next, at step 40, a message data file containing the digital image of the check, the check data elements, if obtained in step 20, and the endorsement data element is created. At step 45, a signed message data file is created using a private key of the endorsing bank. Alternatively, a private key associated with or assigned to the particular check processing device being used may also be utilized in step 45. As is known in the art, the signed message data file is created by first creating a message digest, such as an SHA-2 digest, of the message data file, signing (encrypting) the message digest with the private key to create a digital signature, and combining the digital signature with the message data file. Next, at step 50, the signed message data file is transmitted to a downstream processor, such as a subsequent receiving bank or other check clearing party, using public or private communication channel. At step 55, the signed message data file is archived by the bank or other institution performing the method for future use. At step 60, a determination is made as to whether there are more checks that need to be processed. If the answer is no, then the method ends. If, however, the answer of step 60 is yes, then, at step 65, the next check to be processed is obtained. The method then returns to step 10 for further processing as described above.

As an alternative, the present method may also be used to process checks that are received in electronic form (as digital check images) from, for example, a depositor making an electronic deposit. In that case, step 5 and step 15 will be merged into a single step wherein the electronic image of the first check to be processed is obtained. In addition, step 65 will, in this alternative embodiment, consist of obtaining the next check image to be processed. Otherwise, the remaining steps of the method remain unchanged. In even a further alternative embodiment, checks in both physical and electronic form may be simultaneously processed. For the physical checks, step 15 will be performed to create a digital image of the check. For electronic checks, since the digital image already exists, step 15 is omitted.

In yet a further alternative embodiment of the method shown in FIG. 1, the endorsement data element may also be electronically superimposed on the electronic image of usually the reverse side of the check in a manner such that the electronic data element, preferably in a form that resembles the physical stamping/imprinting that may be used, is clearly legible to the human eye viewing the image or examining a printout of the image (such as in an environment where the image must be printed out because viewing of the electronic image is not available). The electronic image with the superimposed endorsement data element is the digital image of the check that is used to create the message data file in step 40.

Figure 2:
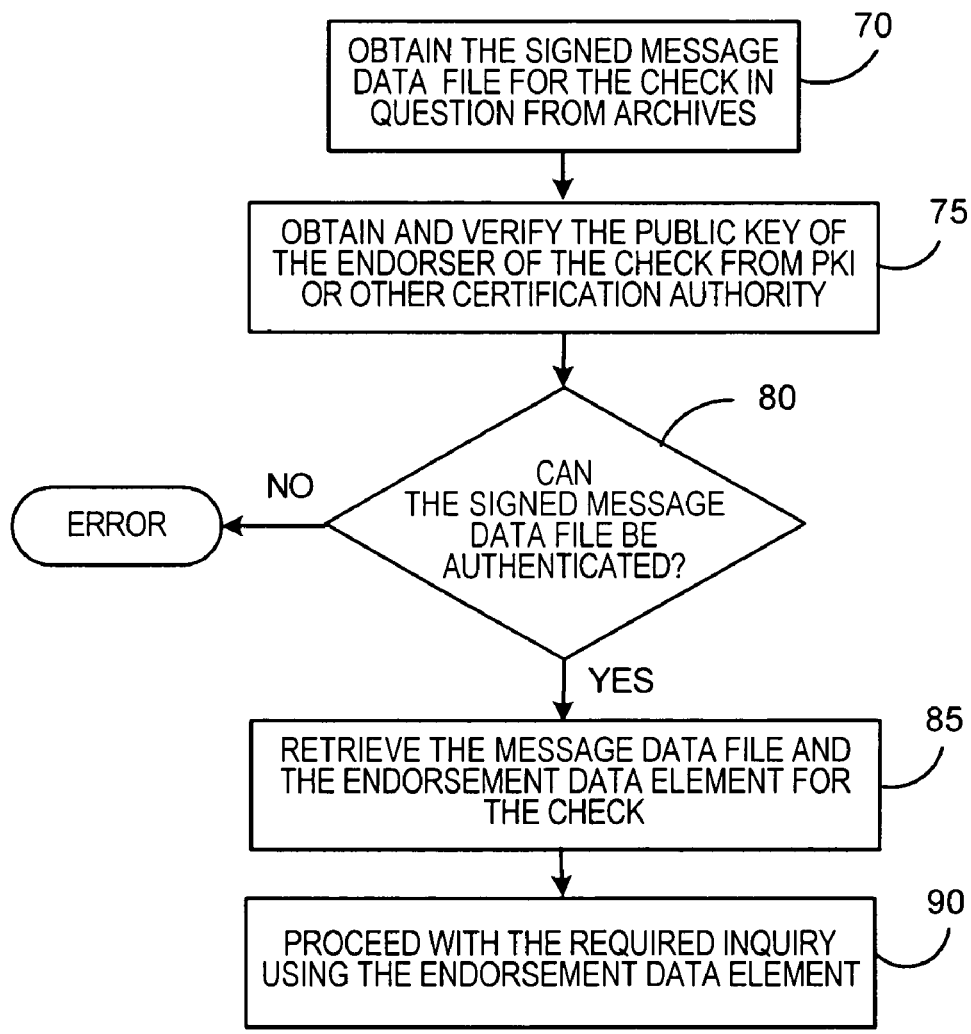
FIG. 2 is a flowchart showing a method of initiating inquiry for a check previously processed in the manner shown in FIG. 1 for audit, investigative or dispute resolution purposes.

FIG. 2 is a flowchart showing a method of initiating inquiry for a check previously processed in the manner shown in FIG. 1 for audit, investigative or dispute resolution purposes. The method of FIG. 2 will result in the trusted retrieval of the identity of the endorsing party, the location at which the endorsement took place, and the time at which the endorsement took place, all of which are very useful for audit, investigative, return or dispute resolution purposes. The method begins at step 70, wherein the signed message data file for the check in question is obtained from the archives of the party initiating the inquiry. As will be appreciated, according to an aspect of the present invention, each party, such as a receiving bank or check clearing party, that receives signed message data files from another party will archive those signed message data files for later use in audit, investigative, return or dispute resolution inquiries.

Next, at step 75, the public key that corresponds to the private key used in step 45 of FIG. 1 (that being the private key of the endorsing party in one embodiment or the private key of the device used to perform the processing in another embodiment) is obtained and verified from a trusted source such as a public key infrastructure or another key certification authority. At step 80, a determination is then made as to whether the signed message data file can be authenticated by verifying the digital signature obtained at the step 45, FIG. 1. As is known in the art, this is preferably performed by using the public key obtained in step 75 to decrypt the digital signature of the signed message data file, creating a message digest from the message data file included as part of the signed message data file, and comparing the so created message digest with the message digest obtained from the decryption of the digital signature. If those message digests match one another, then the signed message data file is deemed to have been authenticated. If the answer at step 80 is no, meaning that the digital signature verification failed (for example when the message was altered without authorization), then an error indication is provided which alerts the processing party to a problem such as potential fraud. If, however, the answer at step 80 is yes, meaning that authentication is successful, then the message data file and the endorsement data element are retrieved from the signed message data file. Then, at step 90, one or more of the data elements included within the endorsement data are utilized in performing the required inquiry. In the preferred embodiment, these data elements will include among others the endorsing bank routing number, which identifies the endorsing party, the endorsing bank branch identifier, which identifies the location at which the endorsement occurred, and the endorsement date, which identifies the time at which the endorsement occurred.

Thus, through the use of the endorsement data element and various known cryptographic techniques, the present invention provides a method for electronically endorsing check images that provides much of the audit, investigative, return items and dispute resolution functionality that is currently available with paper checks that are physically endorsed. In another embodiment of the present invention the endorsement data elements are accessible via the electronic image of the paper check with the electronically superimposed endorsement data as described above.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of electronically endorsing a check utilizing a computer, comprising:

obtaining at said computer an electronic image of said check;

creating an endorsement data element for said check, said endorsement data element including at least a first information element identifying a party endorsing said check;

superimposing electronically at said computer said endorsement data element on said electronic image of said check in a manner such that the electronic data element is human readable when viewing the electronic image and optically recognized via OCR/ICR processing; and utilizing said computer to cryptographically protect, a message data file that includes at least said electronic image of said check and said endorsement data element, in a manner that permits the integrity of and origin of said message data file to be authenticated.

2. The method according to claim 1, wherein said message data file is cryptographically protected by creating a signed message data file that includes said message data file and a digital signature of said message data file created by using a private key.

3. The method according to claim 1, wherein said endorsement data element also includes a second information element identifying a date and/or time on which said check was endorsed.

4. The method according to claim 1, wherein said first information element includes a routing number for said party endorsing said check.

5. The method according to claim 1, wherein said first information element further includes an item sequence number maintained by said party endorsing said check.

6. The method according to claim 1. wherein said obtaining step comprises generating said electronic image from a paper version of said check.

7. The method according to claim 1, wherein said electronic image is received by said party endorsing said check from a third party.

8. The method according to claim 1, further comprising obtaining one or more check data elements from said electronic image, wherein said message data file also includes said one or more check data elements.

9. The method according to claim 1, further including check data elements that include one or more of the issuing bank routing number of said check, the account number of said check, the check number of said check, the amount of said check, and the address of the party issuing the check.

10. The method according to claim 2, wherein said private key is specific to said party endorsing said check.

11. The method according to claim 2, wherein said method is implemented on an electronic device and wherein said private key is specific to said electronic device.

12. The method according to claim 4, wherein said first information element further includes a branch identifier for said party endorsing said check.

13. The method according to claim 2, further comprising transmitting said signed message data file to a downstream processor.

14. The method according to claim 2, further comprising archiving said signed message data file.

15. A method utilizing a computer for performing an inquiry relating to a check, comprising:

obtaining a signed message data file by the computer for said check, said signed message data file including a message data file and a digital signature of said message data file created using a private key, said message data file including an electronic image of said check and an endorsement data element including at least a first information element identifying a party endorsing said check:

obtaining and verifying a public key corresponding to said private key;

determining whether said signed message data file can be authenticated using said digital signature and said public key;

if said signed message data file can be authenticated, retrieving said endorsement data element from said message data file for use in said inquiry; and wherein said endorsement data element is electronically superimposed on said electronic image of said check and can be obtained therefrom through an OCR/ICR process.

16. The method according to claim 15, wherein said private key is specific to a party endorsing said check.

17. The method according to claim 15, wherein said private key is specific to an electronic device used to endorse said check.

18. The method according to claim 15, wherein said endorsement data element also includes a second information element identifying a date and/or time on which said check was endorsed.

19. The method according to claim 15, wherein said first information element includes a routing number for a party endorsing said check.

20. The method according to claim 19, wherein said first information element further includes a branch identifier for said party endorsing said check and an item sequence number maintained by a party endorsing said check.

21. An apparatus comprising:
a scanner for scanning a check to create an electronic image of said check:
a computer in operative communication with said scanner whereby the computer is programmed to
obtain from said scanner said electronic image of said check;
obtain an endorsement data element for said check, said endorsement data element including at least a first information element identifying a party endorsing said check;
superimpose electronically said endorsement data element on said electronic image of said check in a manner such that the electronic data element is human readable when viewing the electronic image and optically recognizable via OCR/ICR processing;
create a message data file that includes at least said electronic image of said check and said endorsement data element; and
cryptographically protect said message data file in a manner that permits the integrity of and origin of said message data file to be authenticated.

* * * * *